US009302571B2

(12) United States Patent
Katsura et al.

(10) Patent No.: US 9,302,571 B2
(45) Date of Patent: Apr. 5, 2016

(54) VEHICLE SUNROOF APPARATUS

(71) Applicant: AISIN SEIKI KABUSHIKI KAISHA, Kariya-shi, Aichi-ken (JP)

(72) Inventors: Shintaro Katsura, Kariya (JP); Ryuta Fukada, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/477,376

(22) Filed: Sep. 4, 2014

(65) Prior Publication Data
US 2015/0069791 A1    Mar. 12, 2015

(30) Foreign Application Priority Data

Sep. 6, 2013 (JP) ................... 2013-185553

(51) Int. Cl.
*B60J 7/19*     (2006.01)
*B60J 7/043*    (2006.01)
*B60J 7/02*     (2006.01)

(52) U.S. Cl.
CPC ............. *B60J 7/0435* (2013.01); *B60J 7/024* (2013.01)

(58) Field of Classification Search
CPC .......... B60J 7/0435; B60J 7/024; B60J 7/185; B60J 7/057
USPC ........................ 296/216.02–216.05, 223, 224
See application file for complete search history.

(56) References Cited

U.S. PATENT DOCUMENTS

2013/0234475 A1    9/2013  Katsura
2013/0264845 A1    10/2013 Katsura et al.

FOREIGN PATENT DOCUMENTS

| EP | 2636553 A1 | 9/2013 |
| JP | 2000-108676 | 4/2000 |
| JP | 2005-014345 | 2/2005 |
| JP | 2013-184648 | 9/2013 |

OTHER PUBLICATIONS

S. Katsura et al., "Vehicle Sunroof Apparatus," U.S. Appl. No. 14/475,818, Filed Sep. 3, 2014.
S. Katsura, "Sunroof Apparatus for Vehicle," U.S. Appl. No. 14/477,255, Filed Sep. 4, 2014.
S. Katsura et al., "Sunroof Apparatus for Vehicle," U.S. Appl. No. 14/478,726, Filed Sep. 5, 2014.
S. Katsura, "Sunroof Apparatus for Vehicle," U.S. Appl. No. 14/478,787, Filed Sep. 5, 2014.

*Primary Examiner* — Dennis H Pedder
(74) *Attorney, Agent, or Firm* — Finnegan, Henderson, Farabow, Garrett & Dunner, LLP

(57) ABSTRACT

A vehicle sunroof apparatus includes: a movable panel adapted to open and close an opening formed on a roof of a vehicle; a guide rail disposed in each edge portion of the opening in a width direction and extending in a longitudinal direction; a slide member linked to each edge portion of the movable panel, being movable along the guide rail, and driven to move by an electrical driving source; a check mechanism regulating a movement of the movable panel; a first member supported by one of each edge portion of the movable panel in the width direction and the slide member; and a second member supported by the other of each edge portion of the movable panel in the width direction and the slide member so as to be pivotally movable around an axis extending in the longitudinal direction.

4 Claims, 8 Drawing Sheets

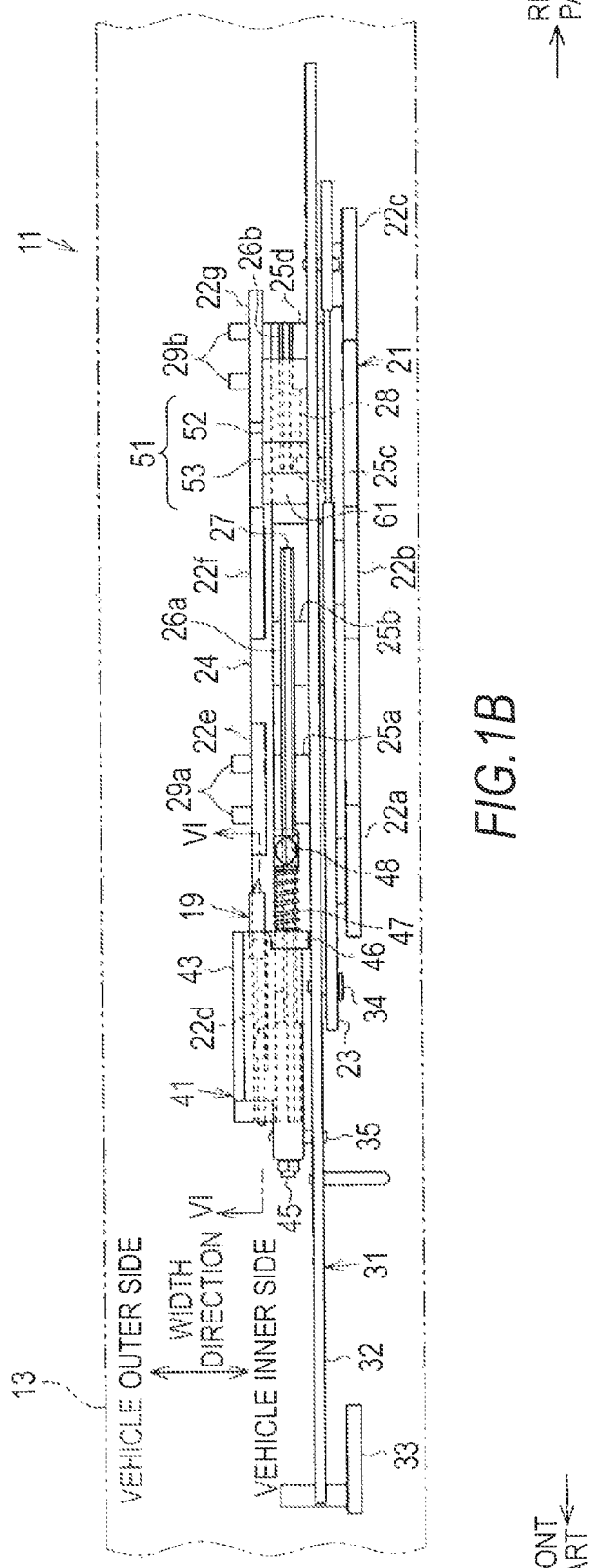
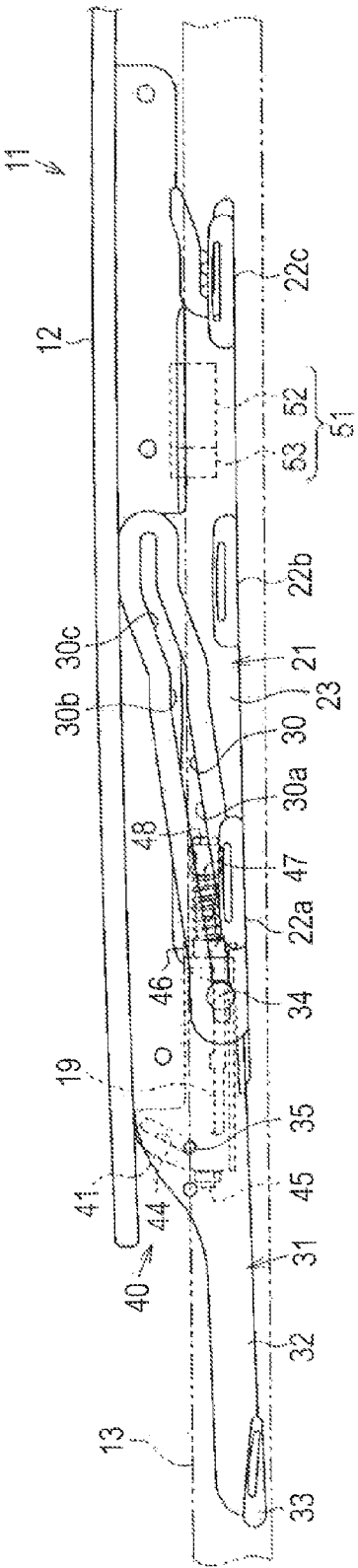
FIG. 1A
FIG. 1B

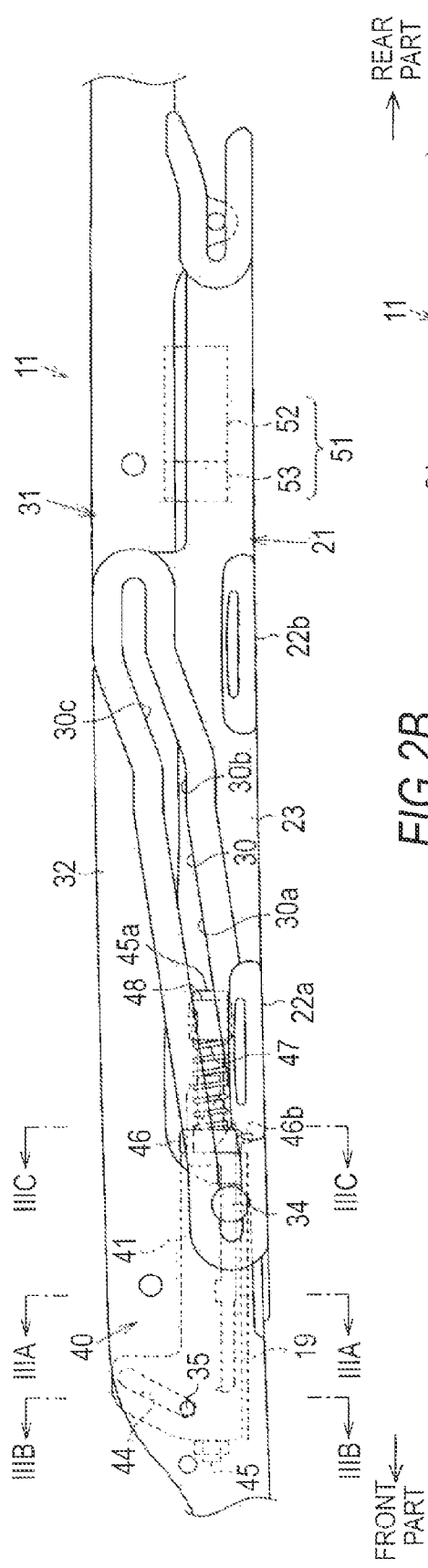
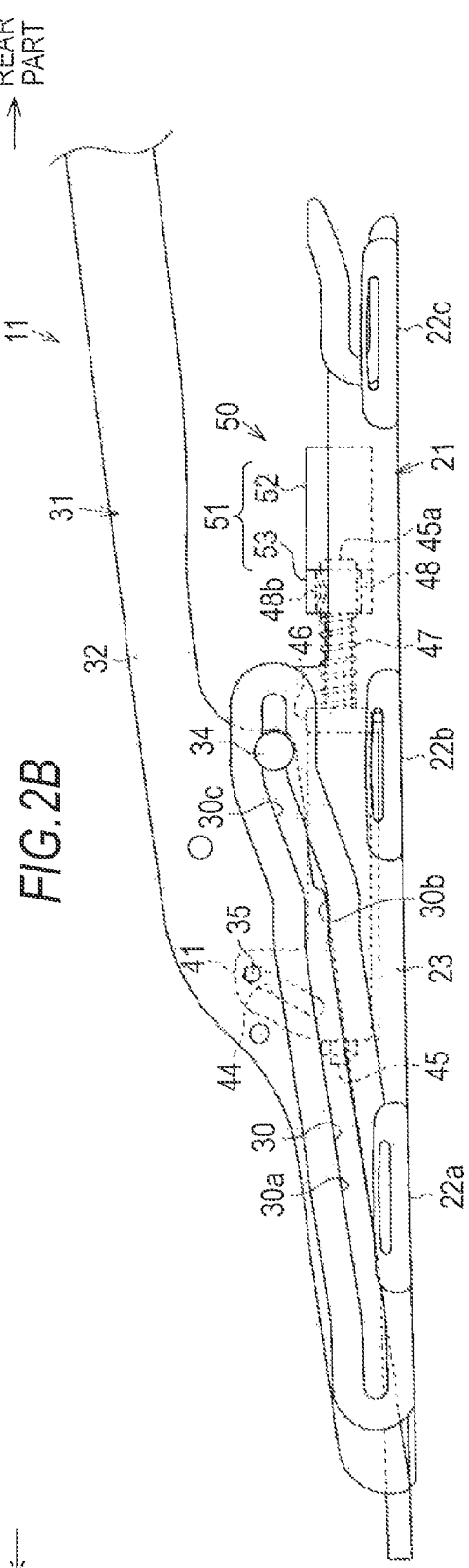
FIG.2A
FIG.2B

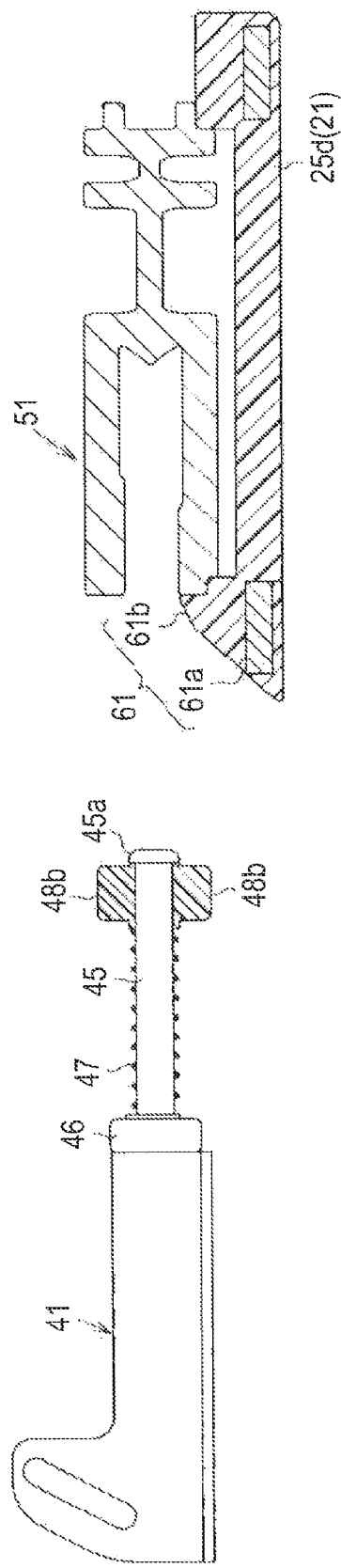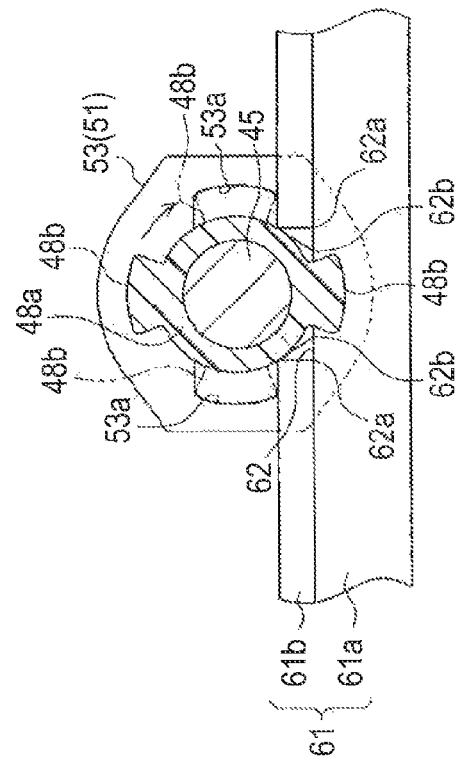

FRONT PART ← → REAR PART

VEHICLE SUNROOF APPARATUS

CROSS REFERENCE TO RELATED APPLICATIONS

This application is based on and claims priority under 35 U.S.C. §119 to Japanese Patent Application 2013-185553, filed on Sep. 6, 2013, the entire contents of which are incorporated herein by reference.

TECHNICAL FIELD

This disclosure relates to a vehicle sunroof apparatus.

BACKGROUND DISCUSSION

In the related art, for example, a vehicle sunroof apparatus disclosed in JP 2000-108676A (Reference 1) is known (a so-called outer slide sunroof). In this apparatus, a link mechanism for supporting a movable panel includes a rear lift link which performs a swinging operation using a slide operation of a first shoe, a front lift link which performs a swinging operation using a slide operation of a second shoe, and a connecting rod which connects the rear lift link and the second shoe and causes the second shoe to perform the slide operation by the swinging operation of the rear lift link. Then, if the first shoe is caused to perform the slide operation, the rear lift link performs the swinging operation and lifts up a rear end of the movable panel. In a process thereof, the swinging operation of the rear lift link is transmitted to the second shoe via the connecting rod. The slide operation of the second shoe which is performed in response to the process causes' the front lift link to perform the swinging operation so as to lift up a front end of the movable panel. In the above-described manner, the movable panel performs a tilting-up operation.

Thereafter, the first shoe and the second shoe are slid. In this manner, the movable panel is slid outward while maintaining a tilting-up state, and an opening formed on a roof is brought into an opened state. In this case, an engagement structure set between the rear lift link and the first shoe is operated an as to cause the rear lift link to perform the swinging operation. Therefore, the setting of the engagement structure enables the movable panel to slowly perform the tilting-up operation.

Incidentally, in the vehicle sunroof apparatus disclosed in Reference 1, a movement amount (operation stroke) of the first shoe which is required from a fully closed state to a fully opened state represents a movement amount from the fully closed state via the tilting-up state to the fully opened state. Therefore, if the movement amount of the first shoe until the fully dosed state is shifted to the tilting-up state (hereinafter, referred to as a "tilting operation stroke") increases, it is difficult to ensure the movement amount of the first shoe until the tilting-up state is shifted to the fully opened state, that is, an opening amount of the movable panel.

In contrast, the tilting operation stroke corresponds to a time interval in a high load state for making the movable panel ascend and descend. Accordingly, it is preferable to ensure that the tilting operation stroke have a longer period. If the tilting operation stroke decreases, a load per unit operation stroke increases. To that extent, increasing a size of an electrical driving source (motor or the like) for driving the first shoe becomes inevitable.

In a vehicle sunroof apparatus (outer slide sunroof) disclosed in Japanese Patent No. 4109583 (Reference 2), a configuration is proposed in which a guide rail protrudes forward so that the guide rail for sliding a shoe penetrates a front frame (housing). In this manner, for example, it is possible to increase the opening amount of the movable panel, or it is possible to enlarge a support span of the movable panel without impairing the opening amount of the movable panel.

However, an increase in the opening amount of the movable panel which is obtained by causing the guide rail to penetrate the front frame is less effective. Consequently, it is still difficult to ensure the opening amount.

SUMMARY

Thus, a need exists for a vehicle sunroof apparatus which is not susceptible to the drawback mentioned above.

An aspect of this disclosure is directed to a vehicle sunroof apparatus including: a movable panel that is adapted to open and close an opening formed on a roof of a vehicle; a guide rail that is disposed in each edge portion of the opening in a width direction of the vehicle and that extends in a longitudinal direction of the vehicle; a slide member that is linked to each edge portion of the movable panel in the width direction of the vehicle, that is disposed to be movable along the guide rail, and that is driven to move by an electrical driving source: a check mechanism that regulates a movement of the movable panel in the longitudinal direction when the slide member moves to a front part of the vehicle in a fully closed state of the movable panel, that shifts the fully closed state to a tilting-up state by causing a rear side section to ascend about a fulcrum of a front side section of the movable panel, and that releases the movement regulation of the movable panel by maintaining the tilting-up state when the slide member moves to a rear part of the vehicle after moving further to the front part of the vehicle in the tilting-up state; a first member that is supported by any one of each edge portion of the movable panel in the width direction of the vehicle and the slide member; and a second member that is supported by the other one of each edge portion of the movable panel in the width direction of the vehicle and the slide member so as to be pivotally movable around an axis extending in the longitudinal direction of the vehicle, wherein the first member includes a first stationary side member which has a plurality of first cam teeth arranged at each predetermined angle around the axis and having a concave portion and a convex portion in the axial direction, and a second stationary side member which is disposed on a side of the first stationary side member which faces the second member, and which has an opening portion for opening an entry to the first cam teeth at each of the predetermined angles around the axis and a locking portion for closing the entry to the first cam teeth, the second member includes second cam teeth which pass through the opening portion and are pressed by the first cam teeth when the slide member moves further to the front part of the vehicle in the tilting-up state, which are pressed by the locking portion when the slide member moves to the rear part of the vehicle thereafter, and in this manner, the second cam teeth are pivotally moved by the predetermined angle, and engage with the locking portion, and a guide surface which can come into contact with the second cam teeth so as to guide the slide member in order to cause both rotation positions of the second cam teeth and the opening portion to coincide with each other when the slide member moves further to the front part of the vehicle in the tilting-up state is formed in each edge portion of the movable panel in the width direction of the vehicle or the slide member which supports the first member.

According to this configuration, in the tilting-up state, if the slide member moves to the rear part of the vehicle after moving further to the front part of the vehicle, the check mechanism maintains the tilting-up state, and releases the movement regulation of the movable panel. In contrast, the second cam teeth pass through the opening portion, and are pressed by the first cam teeth when the slide member moves further to the front part of the vehicle in the tilting-up state. The second cam teeth are pressed by the locking portion when the slide member moves to the rear part of the vehicle thereafter. In this manner, the second cam teeth are pivotally moved by the predetermined angle, and engage with the locking portion. As described above, the locking portion of the first member and the second cam teeth of the second member engage with each other. In this manner, the movable panel moves integrally when the slide member moves to the rear part of the vehicle. Then, the movable panel is opened while the tilting-up state is maintained. In this case, the maximum movement amount of the slide member which defines the fully opened state of the movable panel is not limited by the movement amount of the slide member in an opposite direction (to the front part of the vehicle) when the movable panel is in the tilting-Upstate. Therefore, it is possible to increase the maximum movement amount of the slide member which defines the fully opened state of the movable panel, that is, an opening amount of the movable panel.

In particular, when the slide member moves further to the front part of the vehicle in the tilting-up state, in a state where both rotation positions of the second cam teeth and the opening portion do not coincide with each other, the second cam teeth come into contact with the guide surface. In this manner, the second cam teeth are guided so that these rotation positions coincide with each other. Accordingly, even when the rotation position of the second cam teeth is deviated from the rotation position of the opening portion, the second cam teeth can more reliably pass through the opening portion.

The aspects of this disclosure show an effect in that it is possible to increase an opening amount of a movable panel which performs an opening operation while maintaining a tilting-up state.

BRIEF DESCRIPTION OF THE DRAWINGS

The foregoing and additional features and characteristics of this disclosure will become more apparent from the following detailed description considered with the reference to the accompanying drawings, wherein:

FIGS. 1A and 1B are respectively a plan view and a side view which illustrate an embodiment disclosed here;

FIGS. 2A and 2B are side views respectively illustrating a fully closed state and a second tilting-up state of a movable panel;

FIGS. 7A and 7B are respectively a partially vertical cross-sectional view and a partially horizontal cross-sectional view illustrating an operation performed when a rotary cam and a stationary cam are assembled;

DETAILED DESCRIPTION

Hereinafter, an embodiment of a vehicle sunroof apparatus will be described. In the following description, a longitudinal direction of a vehicle is referred to as a "longitudinal direction", and an upper side and a lower side in a height direction of the vehicle are respectively referred to as an "upper side" and a "lower side". In addition, an inner side in a width direction of the vehicle which faces an inner side of a cabin is referred to as a "vehicle inner side", and an outer side in the width direction of the vehicle which faces an outer side of the cabin is referred to as a "vehicle outer side".

Figure 8:
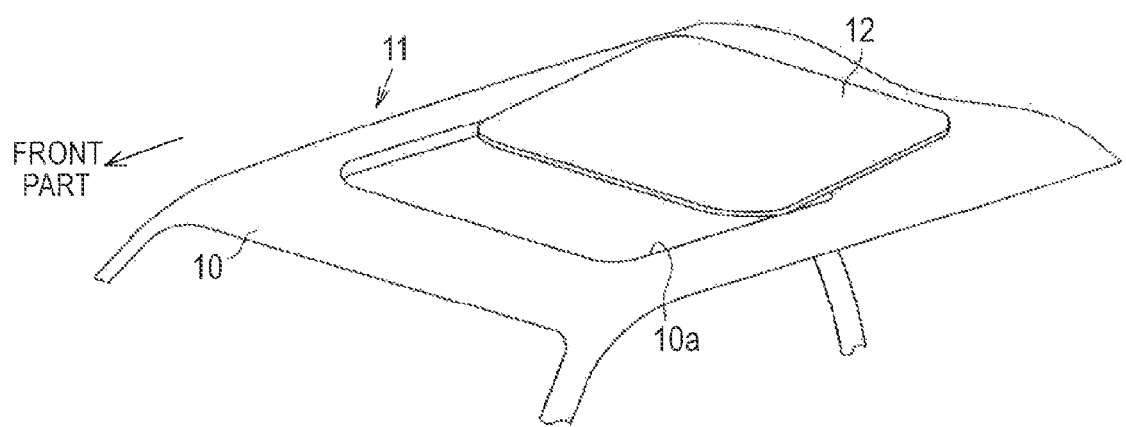
FIG. 8 is a perspective view when a roof is viewed obliquely from above.

As illustrated in FIG. 8, a substantially rectangular opening 10a is formed on a roof 10 of a vehicle such as an automobile, and a sunroof apparatus 11 is mounted thereon. The sunroof apparatus 11 includes a substantially rectangular movable panel 12 which opens and closes the opening 10a by moving in the longitudinal direction, and which is formed of a glass plate, for example.

The movable panel 12 is attached so as to be capable of performing a tilting-up operation in which a rear side section thereof ascends about a fulcrum of a front side section thereof and a slide operation in the longitudinal direction. The opening and closing operations of the opening 10a which are performed by the movable panel 12 adopt a so-called outer sliding method in which the slide operation is performed while a tilting-up state is maintained.

Next, a structure of the sunroof apparatus 11 according to the opening and closing operations of the movable panel 12 will be described.

Figure 9:
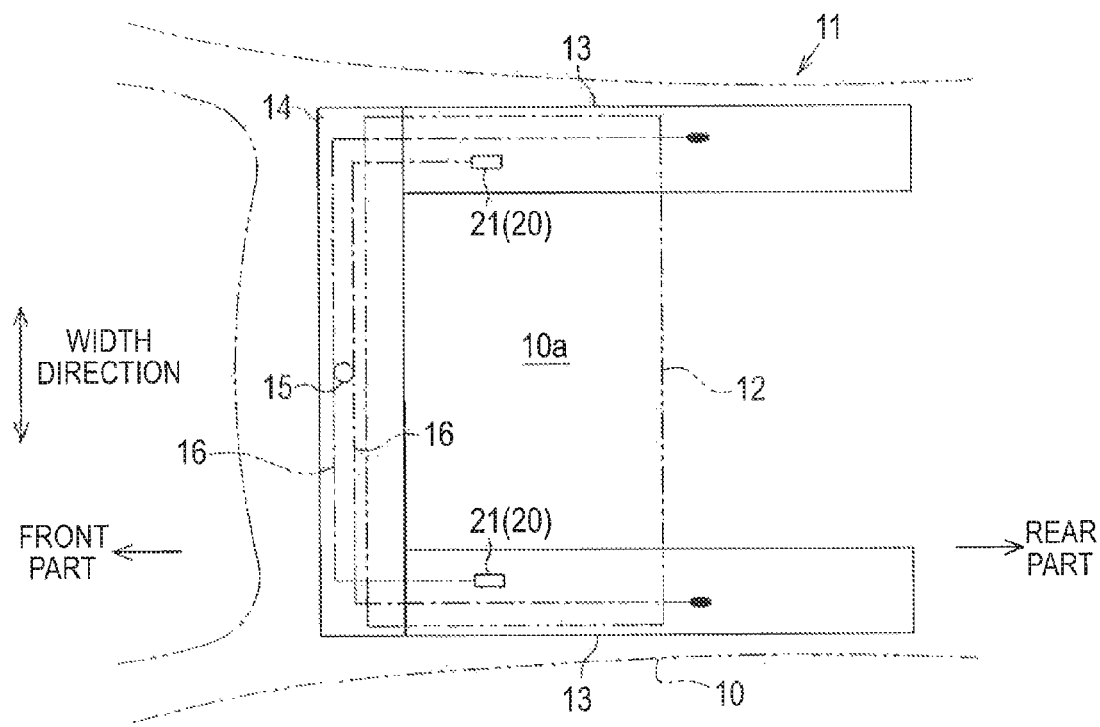
FIG. 9 is a plan view illustrating the embodiment disclosed here.

As illustrated in FIG. 9, a pair of guide rails 13 is arranged in both edge portions of the opening 10a in the width direction of the vehicle. Each guide rail 13 is formed of an extruded material of an aluminum alloy, for example, has a constant cross section, and extends in the longitudinal direction. Then, functional components 20 are respectively guided and supported in each guide rail 13 no as to be movable in the longitudinal direction. The movable panel 12 is linked to and supported by both functional components 20 in a bridging state therebetween. Both functional components 20 cause the movable panel 12 to perform the tilting-up operation or the slide operation in response to the movement in the longitudinal direction along the guide rails 13.

In addition, front ends of both guide rails 13 are connected to each other via a front housing 14 extending in the width direction of the vehicle. An electrical driving source 15 such as an electric motor having an output gear, for example, is installed in an intermediate portion of the front housing 14 in the longitudinal direction. The electrical driving source 15 is connected to each functional component 20 respectively via a pair of driving belts 16 which are formed of a resin material, for example, and which have a substantial strip shape. The electrical driving source 15 simultaneously moves both functional components 20 in the longitudinal direction.

Figure 3A:
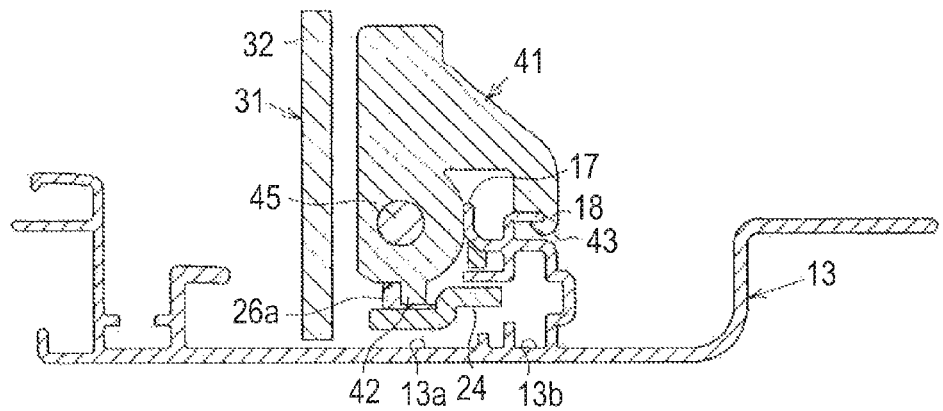
FIGS. 3A to 3C are cross-sectional views respectively taken along line IIIA-IIIA, line IIIB-IIIB, and line IIIC-IIIC in FIG. 2A.
Figure 3B:
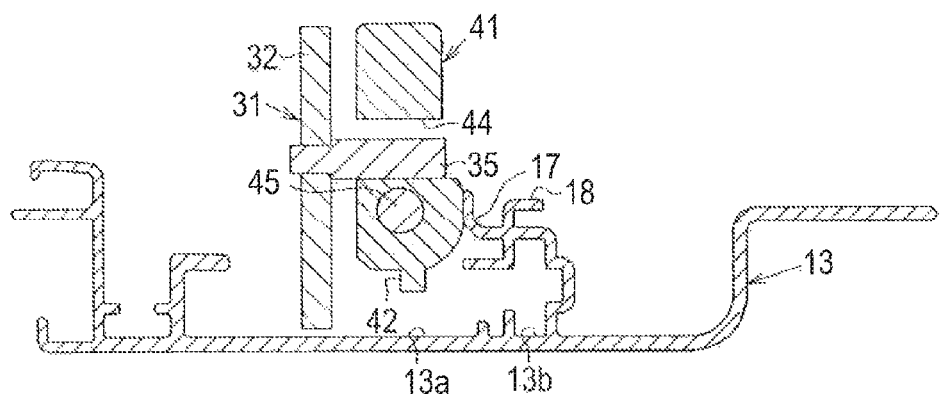
Figure 3C:
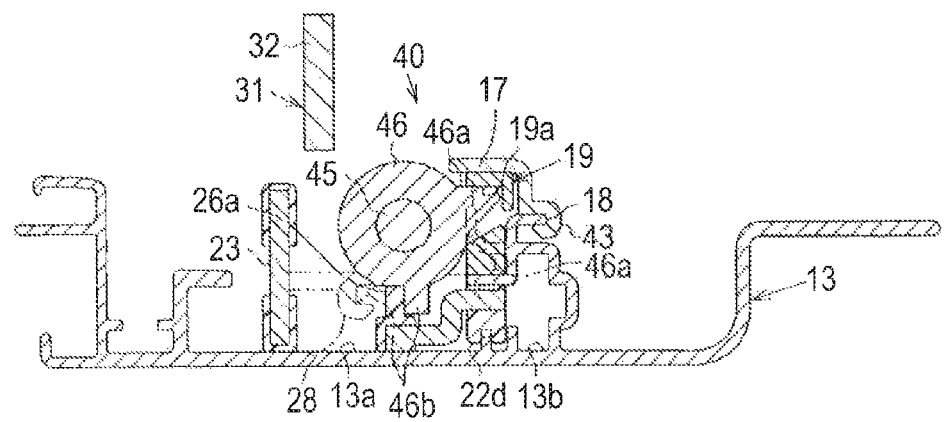

As illustrated in FIGS. 3A to 3C, a first rail portion 13a which opens upward and has a substantial C-shape in cross section is formed in each guide rail 13. A second rail portion 13b is formed adjacent to the vehicle outer side of the first rail portion 13a. The second rail portion 13b forms a substantial T-shape in cross section in cooperation with a lateral wall of the first rail portion 13a, and communicates with the first rail portion 13a in an opening formed on the lateral wall.

Furthermore, a flange-shaped first guide portion 17 is formed on the upper side of the vehicle outer side portion of the first rail portion 13a in the guide rail 13, and a flange-shaped second guide portion 18 is formed on the upper side of the second rail portion 13b.

Figure 6:
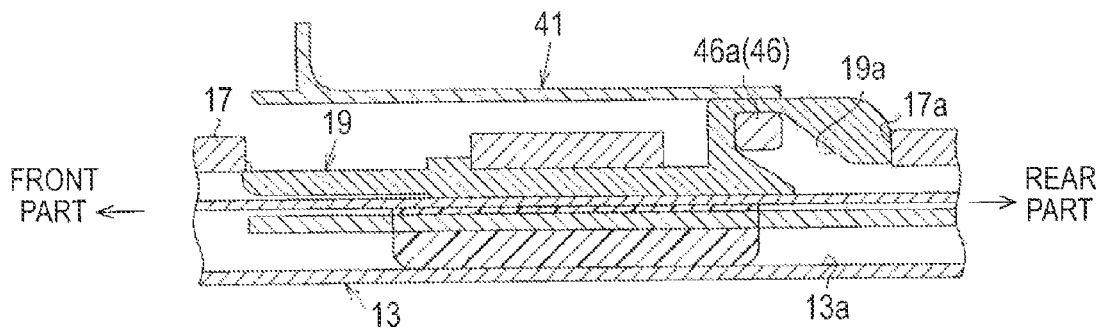
FIG. 6 is a cross-sectional view taken along line VI-VI in FIG. 1A.

As illustrated in FIG. 6, a cutout portion 17a is formed at a predetermined position close to the front side in the longitudinal direction, in the first guide portion 17. Then, a guide block 19 which is placed in the vehicle outer side portion of the first rail portion 13a and is fitted to the first guide portion 17 in the cutout portion 17a is fixed to the guide rail 13. The guide block 19 has an engagement groove 19a which allows communication between the upper side and the lower side of the first guide portion 17 in the rear part of the vehicle, and is formed in a hook shape. The engagement groove 19a is tilted so as to face the lower side as it goes toward the rear part of the vehicle, and a lower end thereof communicates with the lower side of the first guide portion 17.

As illustrated in FIGS. 1A and 1B, a driving shoe 21 serving as a slide member obtained by integrating a metal plate and a resin, for example, is mounted on the guide rail 13 (first rail portion 13a) so as to be movable in the longitudinal direction. That is, in the driving shoe 21, three shoe portions 22a, 22b, and 22c which slide on the vehicle inner side (lower side in FIG. 1A) of the first rail portion 13a are arranged side by side in the longitudinal direction, and four shoe portions 22d, 22e, 22f, and 22g which slide on the vehicle outer side (upper side in FIG. 1A) of the first rail portion 13a are arranged side by side in the longitudinal direction. In addition, in the driving shoe 21, a vertical wall portion 23 which is erected upward in an intermediate portion close to the vehicle inner side of the first rail portion 13a and which connects the shoe portions 22a to 22c is disposed to extend in the longitudinal direction, and a substantially elongated connection wall portion 24 which connects the shoe portions 22d to 22g in the vehicle outer side portion of the first rail portion 13a is disposed to extend in the longitudinal direction. Furthermore, in the driving shoe 21, four communication portions 25a, 25b, 25c, and 25d which connect the vertical wall portion 23 and the connection wall portion 24 in the width direction of the vehicle are arranged side by side in the longitudinal direction.

The communication portions 25a and 25d respectively have extension pieces 29a and 29b which penetrate the shoe portions 22e and 22g and enter the inside of the second rail portion 13b serving as the vehicle outer side. The extension pieces 29a and 29b are connected to the driving belt 16 which slides on the second rail portion 13b in the longitudinal direction. That is, the electrical driving source 15 is connected to the functional component 20 in the driving shoe 21. Then, the electrical driving source 15 moves the driving belt 16 in the longitudinal direction along the guide rail 13 (second rail portion 13b) in the driving shoe 21. In this manner, the driving shoe 21 moves in the longitudinal direction while causing the shoe portions 22a to 22c and the shoe portions 22d to 22g to respectively slide on the vehicle inner side and the vehicle outer side of the first rail portion 13a.

In the driving shoe 21, a substantially rib-shaped first convex portion 26a extending up to a front end of the connection wall portion 24 across both communication portions 25a and 25b located in the front is disposed to extend in the longitudinal direction, and a substantially rib-shaped second convex portion 26b extending up to a rear end of the connection wall portion 24 across both communication portions 25c and 25d located in the rear is disposed to extend in the longitudinal direction. The first and second convex portions 26a and 26b are arranged on the same line in the longitudinal direction in the intermediate portion close to the vehicle outer side of the first rail portion 13a. The first convex portion 26a faces the second convex portion 26b side and further protrudes to the rear part of the vehicle from the communication portion 25b. A gap 27 is formed in the longitudinal direction between the first and second convex portions 26a and 26b. A substantially rib-shaped regulation portion 28 extending in the longitudinal direction between both communication portions 25c and 25d is disposed on the vehicle inner side of the second convex portion 26b.

As illustrated in FIG. 1B, a guide groove 30 which opens in the width direction of the vehicle and extends in the longitudinal direction is formed on the vertical wall portion 23. The guide groove 30 has a first tilted portion 30a which is tilted upward as it goes rearward, has a linear portion 30b which is continuous with the rear end of the first tilted portion 30a and extends substantially in parallel to the guide rail 13, and further has a second tilted portion 30c which is continuous with the rear end of the linear portion 30b and is tilted upward as it goes rearward.

In contrast, a support bracket 31 which extends in the longitudinal direction and is formed of a metal plate, for example, is fixedly attached to a lower surface of the movable panel 12 in each edge portion in the width direction of the vehicle. The support bracket 31 extends over the substantially entire length of the movable panel 12, and has a plate-shaped vertical wall portion 32 which is vertically disposed below the movable panel 12. The vertical wall portion 32 is juxtaposed on the vehicle outer side of the vertical wall portion 23 so as to be interposed between the vertical wall portion 23 and the first convex portion 26a of the driving shoe 21 in the width direction of the vehicle. Then, a front end of the vertical wall portion 32 is connected to a resin-made driven shoe 33 so as to be pivotally moved around the axis extending in the width direction of the vehicle. The driven shoe 33 is mounted on the front side of the driving shoe 21 (shoe portions 22a to 22c) so as to be movable with respect to the first rail portion 13a of the guide rail 13 in the longitudinal direction. The movable panel 12 supported by the support bracket 31 causes a rear side section to ascend about a fulcrum of a front side section in which the vertical wall portion 32 is connected to the driven shoe 33, and performs a tilting-up operation. The movable panel 12 causes the rear side section to descend about a fulcrum of the front side section, and performs a tilting-down operation. The driving shoe 21 and the driven shoe 33 configure the functional component 20.

A substantially cylindrical ascending-descending guide pin 34 formed of a metal material which protrudes to the vehicle inner side and is movably fitted to the guide groove 30 is fixedly attached to a front end portion of the support bracket 31 (vertical wall portion 32).

As illustrated in FIG. 2A, the ascending-descending guide pin 34 is set to be arranged in the lower end of the guide groove 30 (first tilted portion 30a) in the fully closed state of the movable panel 12. Accordingly, if the driving shoe 21 moves to the front part of the vehicle along the guide rail 13 (first rail portion 13a) in this state, the ascending-descending guide pin 34 guided by the guide groove 30 climbs up the first tilted portion 30a and reaches the linear portion 30b. At this time, ascending of the support bracket 31 (ascending-descending guide pin 34) with respect to the driving shoe 21 causes the movable panel 12 to be pivotally moved about a fulcrum of the front side section of the support bracket 31. In this manner, the movable panel 12 performs the tilting-up operation in which the rear side section ascends (first tilting-up state).

Subsequently, if the driving shoe 21 moves further to the front part of the vehicle along the guide rail 13 (first rail portion 13a), as illustrated in FIG. 2B, the ascending-descending guide pin 34 guided by the guide groove 30 climbs up the second tilted portion 30c and reaches the terminal end thereof. At this time, ascending of the support bracket 31 (ascending-descending guide pin 34) with respect to the driving shoe 21 causes the movable panel 12 to be further pivotally moved about the fulcrum of the front side section of the support bracket 31. In this manner, the movable panel 12 performs the tilting-up operation in which the rear side section further ascends (second tilting-up state).

In contrast, if the driving shoe 21 moves to the rear part of the vehicle from the tilting-up state (first or second tilting-up state) of the movable panel 12, the movable panel 12 performs an operation in the order which is substantially opposite to the above-described order.

As illustrated in FIG. 2A, a substantially cylindrical locking pin 35 formed of a metal material which protrudes to the vehicle inner side is fixedly attached to a front end portion which is the front part of the vehicle from the ascending-descending guide pin 34 of the support bracket 31 (vertical wall portion 32).

As illustrated in FIG. 1A, a slide check 41 formed of a resin material, for example, is arranged and supported on the first convex portion 26a of the driving shoe 21. That is, as illustrated in FIG. 3A, the slide check 41 has a substantially rib-shaped guide portion 42 which protrudes downward so as to come into contact with a surface on the vehicle outer side of the first convex portion 26a and which is placed on the driving shoe 21 between the connection wall portion 24 and the first convex portion 26a. The slide check 41 has a fitting portion 43 which is fitted to the second guide portion 18 of the guide rail 13 so as to be slidable in the longitudinal direction. In addition, as illustrated in FIGS. 3A and 3B, the slide check 41 comes into contact with a surface on the vehicle inner side of the first guide portion 17 of the guide rail 13. The slide check 41 causes the fitting portion 43 to slide on the second guide portion 18 while causing the guide portion 42 to slide on the surface on the vehicle outer side of the first convex portion 26a on the driving shoe 21. In this manner, the slide check 41 is movable in the longitudinal direction along the guide rail 13.

As illustrated in FIGS. 2A and 2B, a long allowing hale 44 to which the locking pin 35 is movably fitted is formed in the front end portion of the slide check 41. The allowing hole 44 is linearly tilted upward as it goes toward the rear part of the vehicle. That is, the slide check 41 is connected to the support bracket 31 via the locking pin 35 which is fitted to the allowing hole 44. Then, when the movable panel 12 supported by the support bracket 31 performs the tilting-up operation (or the tilting-down operation), the slide check 41 causes the locking pin 35 to perform idle running inside the allowing hale 44. In this manner, the slide check 41 maintains the above-described state on the driving shoe 21. In other words, the slide check 41 causes the locking pin 35 to perform the idle running inside the allowing hole 44. In this manner, the slide check 41 allows the movable panel 12 to be shifted to the tilting-up state (or the fully closed state) in response to the movement of the driving shoe 21 in the longitudinal direction. In addition, when the tilting operation of the movable panel 12 is regulated, the slide check 41 regulates the longitudinal movement of the locking pin 35 (support bracket 31) in the allowing hole 44. Accordingly, the slide check 41 moves in the longitudinal direction, thereby causing the movable panel 12 supported by the support bracket 31 to integrally move (perform the slide operation) in the longitudinal direction.

A substantially cylindrical support shaft 45 whose central line extends in the longitudinal direction penetrates the slide check 41 in the longitudinal direction. The support shaft 45 is fastened to the slide check 41 so as not to be pivotally movable. Then, a substantially disk-shaped rotation check 46 is adjacent to the slide check 41 and is pivotally supported in a rear end portion in which the support shaft 45 penetrates the slide check 41. Accordingly, the axis of the rotation check 46 coincides with the central line of the support shaft 45. As illustrated in FIG. 30, the rotation check 46 has a substantially triangular pawl-shaped engagement projection 46a which protrudes radially outward at a predetermined angular position (rightward angular position in the illustration) about the center of the support shaft 45. The rotation check 46 has a substantially rectangular portion to be pressed 46b which protrudes radially outward at a predetermined angular position (downward angular position in the illustration) about the center of the support shaft 45. Then, for example, in the fully closed state of the movable panel 12, in the rotation check 46, the engagement projection 46a engages with the engagement groove 19a of the guide block 19, and the portion to be pressed 46b comes into contact with the surface on the vehicle outer side of the first convex portion 26a. Accordingly, in the fully closed state of the movable panel 12, the pivotal movement of the rotation check 46 is regulated by the first convex portion 26a in a state where the engagement projection 46a engages with the engagement groove 19a of the guide block 19. In this manner, the movement of the rotation check 46 in the longitudinal direction is regulated, and the movement of the slide check 41 in the longitudinal direction is regulated together with the rotation check 46. Then, the longitudinal movement of the support bracket 31 connected to the slide check 41 via the allowing hole 44 is also regulated. In this manner, the movable panel 12 is allowed only to be shifted from the fully closed state to the tilting-up state. The guide block 19, the slide check 41, and the rotation check 46 configure the check mechanism 40.

As described above, the gap 27 is formed between the first and second convex portions 26a and 26b. Accordingly, if the first convex portion 26a passes through the portion to be pressed 46b in response to the movement of the driving shoe 21 to the front part of the vehicle, the rotation check 46 is allowed to be pivotally moved inside the gap 27. If the rotation check 46 moves to the rear part of the vehicle together with the driving shoe 21 in this state, the engagement projection 46a is guided by the engagement groove 19a. In this manner, the rotation check 46 is pivotally moved clockwise as illustrated by a two-dot chain line in FIG. 3C. Then, the engagement projection 46a enters the lower side of the first guide portion 17. This regulates the pivotal movement of the rotation check 46. At the same time, the portion to be pressed 46b passes through the position of the first convex portion 26a and is arranged on the vehicle inner side from the first convex portion 26a. At this time, the portion to be pressed 46b is arranged on a movement locus of the regulation portion 28 of the driving shoe 21 in the longitudinal direction.

As illustrated in FIGS. 2A and 2B, a substantially disk-shaped enlarged diameter portion 45a is formed in the rear end of the support shaft 45. Then, a rotary cam 48 which is formed of a resin material, for example, and which serves as a second member is adjacent to the front part of the vehicle of the enlarged diameter portion 45a, and is pivotally supported in the rear end portion of the support shaft 45. That is, the rotary cam 48 has a substantially cylindrical main body portion 48a whose inner diameter is the same as the outer diameter of the support shaft 45 and whose outer diameter is the same as the outer diameter of the enlarged diameter portion 45a. The rotary cam is pivotally supported by the support shaft 45 in the main body portion 48a. Accordingly, the axis of the rotary cam 48 coincides with the central line of the support shaft 45. That is, the rotary cam 48 is arranged coaxially with the rotation check 46.

A coil spring 47 is wound around the support shaft 45 between the rotation check 46 and the rotary cam 48. The coil spring 47 is compressed in the longitudinal direction which coincides with the axial direction thereof, and causes the rotation check 46 and the rotary cam 48 to be biased in a direction of respectively coming into contact with the slide check 41 and the enlarged diameter portion 45a. As a matter of course, the rotary cam 48 is retained by the enlarged diameter portion 45a so as not to move to the rear part of the vehicle.

Figure 4:
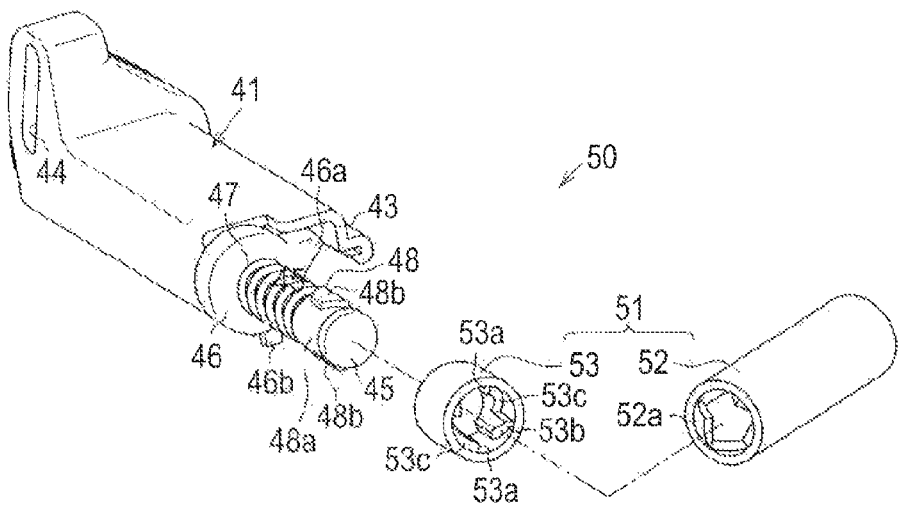
FIG. 4 is an exploded perspective view illustrating an engagement-disengagement switching mechanism.
Figure 5:
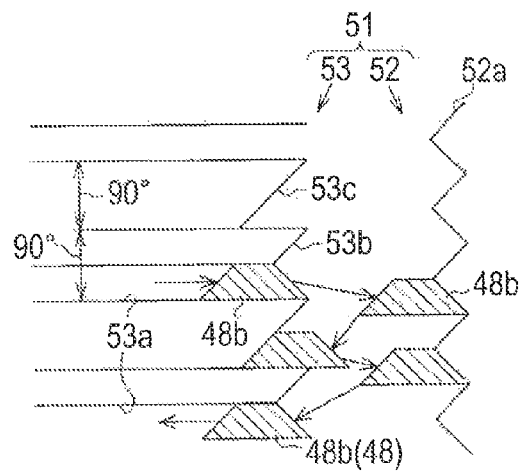
FIG. 5 is a view for illustrating an operation of the engagement-disengagement switching mechanism by deploying the engagement-disengagement switching mechanism in a circumferential direction.

As illustrated in FIGS. 4 and 5, the rotary cam 48 has a pair of second cam teeth 48b disposed to protrude on an outer peripheral surface of the main body portion 48a. The second cam teeth 48b are formed in a substantially isosceles trapezoidal shape which has a long side and a short side, and which extends in the longitudinal direction. The second cam teeth 48b are arranged so as to face each other in the radial direction about the axis of the rotary cam 48. Each of the second cam teeth 48b extends in the circumferential direction about the axis of the rotary cam 48, within a range of an angle (45° in the embodiment disclosed here) which is smaller than a predetermined angle (90° in the embodiment disclosed here).

In contrast, as illustrated in FIG. 1A, a stationary cam 51 which is formed of a resin material, for example, and which serves as a first member is arranged and supported on the second convex portion 26b of the driving shoe 21. The stationary cam 51 is separated from the rotary cam 48 at a position of the driving shoe 21 which corresponds to when at least the movable panel 12 is shifted from the fully closed state to the first tilting-up state.

In addition, as illustrated in FIG. 2B, the longitudinal position of the stationary cam 51 is overlapped with the longitudinal position of the rotary cam 48 at the position of the driving shoe 21 which corresponds to when the movable panel 12 is shifted to the second tilting-up state.

As illustrated in FIG. 4, the stationary cam 51 has a substantially bottomed cylindrical first stationary side member 52 which is arranged on a side separated from the slide check 41. As illustrated in FIG. 5, a plurality of substantially triangular teeth-shaped first cam teeth 52a which are arranged at each of the predetermined angles (90°) around the axis thereof and which are uneven in the axial direction are formed in a front end portion (opening end portion) of the first stationary side member 52.

In addition, as illustrated in FIG. 4, the stationary cam 51 has a substantially cylindrical second stationary side member 53 which is arranged on a side close to the slide check 41. In an inner peripheral portion of the second stationary side member 53, a pair of opening portions 53a communicating with each other along the axial direction are formed so as to face each other in the radial direction. As illustrated in FIG. 5, a rear end portion (upper side in the illustration) of each opening portion 53a is tilted so as to be gradually widened as it goes toward the rear end, thereby forming a guide portion 53b. The opening portions 53a communicating with each other over the entire length in the axial direction of the second stationary side member 53 extend in the circumferential direction about the axis of the stationary cam 51, within a range of the same angle (45°) as that of the first cam teeth 52a. The opening portions 53a including the guide portion 53b extend in the circumferential direction, within a range of the predetermined angle (90°).

Furthermore, as illustrated in FIG. 4, in the rear end portion (opening end portion) of the second stationary side member 53, a pair of locking portions 53c tilted to the front part of the vehicle as it goes from the opening portion 53a to the guide portion 53b is formed between both opening portions 53a in the circumferential direction. The respective locking portions 53c extend in the circumferential direction about the axis of the stationary cam 51 within the range of the predetermined angle (90°). In addition, in the respective locking portions 53c, both apexes of the first cam teeth 52a which turn in the longitudinal direction face each other in the longitudinal direction, in the intermediate portion in the circumferential direction. That is, a phase difference of a predetermined angle which is smaller than the predetermined angle (90°) is set between both apexes of the locking portion 53c which turn in the longitudinal direction and both apexes of the first cam teeth 52a which turn in the longitudinal direction.

In this configuration, in a state where the rotary cam 48 (slide check 41) and the stationary cam 51 are separated from each other in the longitudinal direction (for example, until the movable panel 12 is shifted from the fully closed state to the first tilting-up state), the angular position of the second cam teeth 48b is maintained by a biasing force of the coil spring 47 so as to coincide with the angular position of the opening portion 53a. Accordingly, if the stationary cam 51 moves to the front part of the vehicle together with the driving shoe 21 in order to shift the movable panel 12 to the second tilting-up state, as illustrated in FIG. 5, an entry to the first cam teeth 52a is opened by the opening portion 53a. In this manner, the second cam teeth 48b pass through the opening portion 53a and are pressed by the first cam teeth 52a. At this time, the second cam teeth 48b are guided by the first cam teeth 52a, and are pivotally moved by the above-described phase difference between the locking portion 53c and the first cam teeth 52a. In this manner, when the stationary cam 51 moves to the rear part of the vehicle together with the driving shoe 21 thereafter, the entry to the first cam teeth 52a (exit from the first cam teeth 52a) is closed by the locking portion 53c.

Accordingly, if the stationary cam 51 moves to the rear part of the vehicle together with the driving shoe 21 in order to cause the movable panel 12 to perform a slide operation (that is, an opening operation) to the rear part of the vehicle, as illustrated in FIG. 5, the second cam teeth 48b are pivotally moved and guided by the locking portion 53c, and engage with the locking portion 53c. As described above, the rotary cam 48 and the stationary cam 51 engage with each other. In this manner, the slide check 41 moves integrally to the rear part of the vehicle. Then, the support bracket 31 connected to the slide check 41 via the locking pin 35 also moves integrally to the rear part of the vehicle. The rotary cam 48 and the stationary cam 51 configure an engagement-disengagement switching mechanism 50.

Here, as illustrated in FIGS. 7A and 7B, in a communication portion 25d of the driving shoe 21, a front end portion thereof is arranged in the front part of the vehicle from the front end of the stationary cam 51. A guide surface 61 which tilts upward as it goes toward the rear part of the vehicle is formed in the front end portion. The guide surface 61 has a first guide surface 61a which faces obliquely upward to the rear part of the vehicle from a lower end of the communication portion 25d, and has a second guide surface 61b which faces obliquely upward to the rear part of the vehicle from an upper end of the first guide surface 61a. A tilting angle of the second guide surface 61b is set to be gentler than a tilting angle of the first guide surface 61a. In this manner, it is possible to further shorten a distance of the guide surface 61 in the longitudinal direction, compared to a case where the tilting angle of the overall guide surface 61 is configured to have the tilting angle of the second guide surface 61b. The decreased size of the guide surface 61 can prevent the guide surface 61 (first guide surface 61a) from interfering with the rotation check 46 in a state where the rotary cam 48 and the stationary cam 51 engage with each other. In addition, the second guide surface 61b is divided into two in the width direction of the vehicle by a substantially V-shaped groove 62 which is formed in the central portion of the vehicle in the width direction. In the groove 62, a distance in the width direction is continuously narrowed from a front end 62a toward a rear end 62b of the groove 62. In this manner, in the movement of the rotary cam 48 in the longitudinal direction, the rotary cam 48 is guided to a central position of the groove 62 in the width direction. Accordingly, it is possible to more stably cause the positions of the rotary cam 48 and the stationary cam 51 in the width direction to coincide with each other. Therefore, it is possible to more stably cause the rotary cam 48 and the stationary cam 51 to engage with each other.

The second stationary side member 53 of the stationary cam 51 is installed so that both of the opening portions 53a are respectively arranged on both sides in the width direction of the vehicle. A position of a lower end on an inner wall surface of the respective opening portions 53a substantially coincides with a position of an upper end of the second guide surface 61b in the height direction of the vehicle. Accordingly, when the rotary cam 48 (slide check 41) and the stationary cam 51 are in a state of being separated from each other in the longitudinal direction, if both of the second cam teeth 48b of the rotary cam 48 are respectively arranged on both sides of the vehicle in the width direction, the stationary cam 51 together with the driving shoe 21 is caused to move to the front part of the vehicle. In this manner, both of the second cam teeth 48b pass through both of the opening portions 53a as described above.

In contrast, as illustrated by a solid line in FIG. 7B, when the rotary cam 48 (slide check 41) and the stationary cam 51 are in a state for being separated from each other in the longitudinal direction, a case is assumed in which the rotary cam 48 is pivotally moved due to influence of an external force generated by foreign matter mixture or human contact, and in which both of the second cam teeth 48b of the rotary cam 48 cannot be respectively arranged on both sides of the vehicle in the width direction. In this case, one of the second cam teeth 48b which is to be arranged close to the lower side is located below the upper end of the second guide surface 61b. Thus, one of the second cam teeth 48b comes into contact with the guide surface 61 when the stationary cam 51 together with the driving shoe 21 is caused to move to the front part of the vehicle. Accordingly, the rotary cam 48 causes one of the second cam teeth 48b to ascend along the guide surface 61, and is pivotally moved around the support shaft 45. Then, as illustrated by a two-dot chain line in FIG. 7B, if one of the second cam teeth 48b reaches the upper end of the second guide surface 61b, both of the second cam teeth 48b are respectively arranged on both sides of the vehicle in the width direction. In this manner, both of the second cam teeth 48b can pass through both of the opening portions 53a.

Next, an operation of the embodiment disclosed here will be described.

First, the movable panel 12 is assumed to be in the fully closed state. In this case, the pivotal movement of the rotation check 46 is regulated by the first convex portion 26a in a state where the engagement projection 46a engages with the engagement groove 19a of the guide block 19. In this manner, the longitudinal movement of the rotation check 46 is regulated, and the longitudinal movement of the slide check 41 is regulated together with the rotation check 46. Then, the longitudinal movement of the support bracket 31 connected to the slide check 41 via the allowing hole 44 is also regulated. In this manner, the movable panel 12 is allowed to perform only the tilting-up operation in which the rear side section ascends about a fulcrum of the front side section of the support bracket 31.

If the driving shoe 21 moves to the front part of the vehicle in this state, the allowing hole 44 is caused to perform idle running so that the locking pin 35 ascends along the allowing hole 44 of the slide check 41. The ascending-descending guide pin 34 guided by the guide groove 30 climbs up the first tilted portion 30a and reaches the linear portion 30b. In response to this, the support bracket 31 (ascending-descending guide pin 34) ascends with respect to the driving shoe 21. In this manner, the movable panel 12 is shifted to the first tilting-up state.

As described above, the rotary cam 48 and the stationary cam 51 of the engagement-disengagement switching mechanism 50 are separated from each other in the longitudinal direction at the position of the driving shoe 21 which corresponds to when at least the movable panel 12 is shifted from the fully closed state to the first tilting-up state. Accordingly, if the driving shoe 21 moves to the rear part of the vehicle in a state where the movable panel 12 is in the first tilting-up state, the allowing hole 44 is caused to perform the idle running so that the locking pin 35 descends along the allowing hole 44 of the slide check 41. The ascending-descending guide pin 34 guided by the guide groove 30 climbs down the first tilted portion 30a and reaches the terminal end of the first tilted portion 30a. In response to this, the support bracket 31 (ascending-descending guide pin 34) descends with respect to the driving shoe 21. In this manner, the movable panel 12 performs the tilting-down operation in which the rear side section descends about a fulcrum of the front side section of the support bracket 31, and is shifted to the fully closed state. That is, as long as the movable panel 12 is shifted between the fully closed state and the first tilting-up state, the movable panel 12 performs only the tilting operation in response to the longitudinal movement of the driving shoe 21.

In contrast, if the driving shoe 21 moves further to the front part of the vehicle in a state where the movable panel 12 is in the first tilting-up state, the allowing hole 44 is caused to perform the idle running so that the locking pin 35 further ascends along the allowing hole 44 of the slide check 41. The ascending-descending guide pin 34 guided by the guide groove 30 climbs up the second tilted portion 30c and reaches the terminal end thereof. In response to this, the support bracket 31 (ascending-descending guide pin 34) further ascends with respect to the driving shoe 21. In this manner, the movable panel 12 is shifted to the second tilting-up state. In addition, the rotation check 46 in which the first convex portion 26a passes through the portion to be pressed 46b in response to the movement of the driving shoe 21 to the front part of the vehicle is allowed to perform the pivotal movement inside the gap 27.

At this time, the longitudinal positions of the rotary cam 48 and the stationary cam 51 in the engagement-disengagement switching mechanism 50 are overlapped with each other. Accordingly, since the entry to the first cam teeth 52a is opened by the opening portion 53e, the second cam teeth 48h of the rotary cam 48 pass through the opening portion 53a and are pressed by the first cam teeth 52a. Then, the second cam teeth 48b are guided by the first cam teeth 52a, and are pivotally moved by the above-described phase difference between the locking portion 53c and the first cam teeth 52a.

In a case where both of the second cam teeth 48b are not respectively arranged on both sides of the vehicle in the width direction in a state before both of the second cam teeth 48b of the rotary cam 48 respectively reach both of the opening portions 53a of the second stationary side member 53, the rotary cam 48 is guided by the guide surface 61, and is pivotally moved around the support shaft 45 as described above. In this manner, both of the second cam teeth 48b can be respectively arranged on both sides of the vehicle in the width direction, and both of the second cam teeth 48b can pass through both of the opening portions 53a.

If the driving shoe 21 moves to the rear part of the vehicle thereafter, the second cam teeth 48b of the rotary cam 48 are pivotally moved and guided by the locking portion 53c of the second stationary side member 53, and engage with the locking portion 53c. As described above, the rotary cam 48 and the stationary cam 51 engage with each other. In this manner, the rotation check 46 and the slide check 41 are about to integrally move to the rear part of the vehicle.

At this time, the engagement projection 46a is guided by the engagement groove 19a. In this manner, the rotation check 46 which is allowed to be pivotally moved inside the gap 27 is pivotally moved so that the engagement projection 46a enters the lower side of the first guide portion 17. Then, the pivotal movement of the rotation check 46 is regulated in this state. In this manner, the movement regulation of the slide check 41 in the longitudinal direction is released, and the movement regulation of the support bracket 31 in the longitudinal direction which is connected to the slide check 41 via the allowing hole 44 is also released. At the same time, the portion to be pressed 46b passes through the position of the first convex portion 26a, is arranged on the vehicle inner side from the first convex portion 26a, and is arranged on a movement locus of the regulation portion 28 of the driving shoe 21 in the longitudinal direction.

Accordingly, if the driving shoe 21 moves to the rear part of the vehicle, the rotation check 46 and the slide check 41 integrally move to the rear part of the vehicle together with the stationary cam 51. At this time, a longitudinal distance between the rotation check 46 (slide check 41) and the stationary cam 51 is maintained to be constant. In this manner, a longitudinal distance between the driving shoe 21 and the support bracket 31 is also maintained to be constant. Accordingly, the movable panel 12 supported by the support bracket 31 moves to the rear part of the vehicle while maintaining the second tilting-up state, and opens the opening 10a. In this manner, the movable panel 12 is brought into an opened state.

In the opened state of the movable panel 12, the pivotal movement of the rotation check 46 is regulated in a state where the engagement projection 46a enters the lower side of the first guide portion 17 as described above. Then, the portion to be pressed 46b is arranged on a movement locus of the regulation portion 28 in the longitudinal direction. Accordingly, if the driving shoe 21 moves to the front part of the vehicle in this state, the regulation portion 28 presses the portion to be pressed 46b. In this manner, the slide check 41 integrally moves to the front part of the vehicle together with the rotation check 46. This configuration is adopted an that the first cam teeth 52a do not press the second cam teeth 48b by arranging the second cam teeth 48b of the rotary cam 48 to be separated from the first cam teeth 52a of the first stationary side member 52 in the longitudinal direction, when the driving shoe 21 moves to the front part of the vehicle in the opened state of the movable panel 12. Even in this case, since the longitudinal distance between the slide check 41 and the stationary cam 51 is maintained to be constant, the longitudinal distance between the driving shoe 21 and the support bracket 31 is also maintained to be constant. Accordingly, the movable panel 12 supported by the support bracket 31 moves to the front part of the vehicle while maintaining the second tilting-up state, and closes the opening 10a.

If the movable panel 12 is almost in an initial state where the movable panel 12 is shifted to the second tilting-up state in response to a closing operation of the movable panel 12, the first convex portion 26a passes through the portion to be pressed 46b. In this manner, the rotation check 46 is allowed to be pivotally moved inside the gap 27. Accordingly, since the engagement projection 46a is guided by the engagement groove 19a, the rotation check 46 is pivotally moved so that the engagement projection 46a enters the upper end of the engagement groove 19a. Then, the pivotal movement of the rotation check 46 is regulated in this state. In this manner, the longitudinal movement of the slide check 41 is regulated, and the longitudinal movement of the support bracket 31 connected to the slide check 41 via the allowing hole 44 is also regulated. At the same time, the portion to be pressed 46b passes through the position of the first convex portion 26a, is arranged on the vehicle outer side from the first convex portion 26a, and strays from the movement locus of the regulation portion 28 in the longitudinal direction.

In response to this operation, the first cam teeth 52a press the second cam teeth 48b. In this manner, the second cam teeth 48b are guided by the first cam teeth 52a, and are pivotally moved by the above-described phase difference between the locking portion 53c and the first cam teeth 52a. In this manner, when the stationary cam 51 moves to the rear part of the vehicle together with the driving shoe 21 thereafter, the second cam teeth 48b are pivotally moved and guided by the guide portion 53b, and the entry to the first cam teeth 52a (exit from the first cam teeth 52a) is opened by the opening portion 53a. At this time, both of the second cam teeth 48b are respectively arranged on both sides of the vehicle in the width direction, as a matter of course. Accordingly, the rotary cam 48 causes the second cam teeth 48b to pass through the opening portion 53a, and disengages from the second stationary side member 53 (stationary cam 51). Then, the stationary cam 51 moves to the rear part of the vehicle together with the driving shoe 21 while leaving the rotary cam 48 behind.

At this time, the allowing hole 44 is caused to perform the idle running so that the locking pin 35 descends along the allowing hole 44 of the slide check 41, and the ascending-descending guide pin 34 is guided so as to descend along the guide groove 30. In this manner, the movable panel 12 performs the tilting-down operation, and is shifted to the fully closed state after passing through the first tilting-up state.

As described above, according to the embodiment disclosed here, the following effects can be obtained.

(1) According to the embodiment disclosed here, in the first tilting-up state, if the driving shoe 21 moves to the rear part of the vehicle after moving further to the front part of the vehicle, the check mechanism 40 maintains the second tilting-up state, and releases the movement regulation of the movable panel 12. In contrast, the second cam teeth 48b of the rotary cam 48 pass through the opening portion 53a and are pressed by the first cam teeth 52a when the driving shoe 21 moves further to the front part of the vehicle in the first tilting-up state. When the driving shoe 21 moves to the rear part of the vehicle thereafter, the second cam teeth 48b are pressed by the locking portion 53c. In this manner, the second cam teeth 48b are pivotally moved by the predetermined angle (90°), and engage with the locking portion 53c. As described above, the locking portion 53c of the stationary cam 51 and the second cam teeth 48b of the rotary cam 48 engage with each other. In this manner, the movable panel 12 moves integrally when the driving shoe 21 moves to the rear part of the vehicle. In this case, the maximum movement amount of the driving shoe 21 which defines the fully opened state of the movable panel 12 is not limited by the movement amount of the driving shoe 21 in an opposite direction (opposite to the front part of the vehicle) when the movable panel 12 is in the tilting-up state. Therefore, it is possible to increase the maximum movement amount of the driving shoe 21 which defines the fully opened state of the movable panel 12, that is, an opening amount of the movable panel 12.

As described above, in the engagement-disengagement switching mechanism 50, it is possible to cause the stationary cam 51 and the rotary cam 48 to engage with each other by using a very simple structure in which the second cam teeth 48b passing through the opening portion 53a are sequentially pressed by the first cam teeth 52a and the locking portion 53c, and are pivotally moved by the predetermined angle.

In particular, when the driving shoe 21 moves further to the front part of the vehicle in the first tilting-up state, in a state where both rotation positions of the second cam teeth 48b and the opening portion 53a do not coincide with each other, the second cam teeth 48b come into contact with the guide surface 61. In this manner, the second cam teeth 48b are guided so that these rotation positions coincide with each other. Accordingly, even when the rotation position of the second cam teeth 48b is deviated from the rotation position of the opening portion 53a, the second cam teeth 48b can more reliably pass through the opening portion 53a.

(2) According to the embodiment disclosed here, the movement regulation and the movement release of the movable panel 12 which are performed by the check mechanism 40 are switched therebetween by the engagement and the disengagement between the engagement projection 46a and the engagement groove 19a in response to the pivotal movement of the rotation check 46 around the axis extending in the longitudinal direction. In contrast, the engagement between the stationary cam 51 and the rotary cam 48 in the engagement-disengagement switching mechanism 50 is realized by the further movement of the driving shoe 21 to the front part of the vehicle in the first tilting-up state, that is, the movement along the axis. Accordingly, the movement regulation and the movement release of the movable panel 12 which are performed by the check mechanism 40, and the engagement between the stationary cam 51 and the rotary cam 48 in the engagement-disengagement switching mechanism 50 can be realized in conjunction with the movement in the longitudinal direction along the movement direction of the driving shoe 21. Accordingly, for example, it is possible to allow the overall apparatus to be more compact by connecting the rotation check 46 to the rotary cam 48 and collectively arranging the rotary cam 48 and the rotation check 46.

(3) According to the embodiment disclosed here, if the driving shoe 21 moves to the front part of the vehicle in the opened state of the movable panel 12, the second tilting-up state is maintained by the check mechanism 40 while the movement regulation of the movable panel 12 is released until the movable panel 12 is in an initial resetting state in which the fully closed state is shifted to the first tilting-up state. Then, the portion to be pressed 46b of the rotation check 46 is pressed by the regulation portion 28. In this manner, the movable panel 12 moves to the front part of the vehicle integrally with the driving shoe 21, and is closed while the second tilting-up state is maintained. At this time, since the movable panel 12 side (portion to be pressed 46b) is pressed by the regulation portion 28, the pressing of the first cam teeth 52a against the second cam teeth 48b is regulated. Accordingly, for example, it is possible to avoid a case where the second cam teeth 48b are pivotally moved and the engagement-disengagement switching mechanism 50 is unstably operated.

If the movable panel 12 is in the resetting state thereafter, when the driving shoe 21 moves further to the front part of the vehicle, the check mechanism 40 regulates the movement of the movable panel 12, and releases the maintaining of the second tilting-up state. In contrast, when the driving shoe 21 moves further to the front part of the vehicle in the resetting state, the second cam teeth 48b are pressed by the first cam teeth 52a, and when the driving shoe 21 moves to the rear part of the vehicle thereafter, the second cam teeth 48b are guided by the opening portion 53a. In this manner, the second cam teeth 48b are pivotally moved by the predetermined angle (90°), and pass through the opening portion 53a. As described above, the stationary cam 51 and the rotary cam 48 disengage from each other. In this manner, the driving shoe 21 moves to the rear part of the vehicle while leaving the movable panel 12 behind. Accordingly, it is possible to cause the stationary cam 51 and the rotary cam 48 to disengage from each other by using a very simple structure in which the engagement-disengagement switching mechanism 50 causes the second cam teeth 48b to be pressed by the first cam teeth 52a, to be guided by the opening portion 53a (guide portion 53b), and to be pivotally moved by the predetermined angle.

Then, in response to the movement of the driving shoe 21 to the rear part of the vehicle, the rear side section of the movable panel 12 descends about the fulcrum of the front side section, and the movable panel 12 is brought into the fully closed state. In this case, it is possible to ensure a sufficient movement amount of the driving shoe 21 when the movable panel 12 is shifted from the tilting-up state to the fully closed state. Therefore, it is possible to decrease a load (motor output) per unit movement amount of the driving shoe 21. Consequently, it is possible to avoid an increase in the size of the electrical driving source 15.

In particular, when variations in a rotation speed of a motor exceed a predetermined threshold value (hereinafter, also referred to as a "reverse load") in response to opening and closing operations of the movable panel 12, if there is provided a function for reversely operating the movable panel 12 by determining whether the movable panel 12 is pinched, it is also possible to decrease the reverse load since the variations in the rotation speed are small during a normal operation. That is, even when the reverse load is decreased, the above-described function can decrease a possibility of erroneous determination of whether the movable panel 12 is pinched. In this case, for example, there is a possibility that a standard (equal to or less than 100 N) pursuant to European laws and regulations can be satisfied. Therefore, there is a possibility that the movable panel 12 can be automatically closed.

(4) According to the embodiment disclosed here, the second cam teeth 48b (rotary cam 48) is connected to the slide check 41 of the check mechanism 40 so as to be pivotally movable. In this manner, it is possible to collectively arrange the second cam teeth 48b (rotary cam 48) in the check mechanism 40, and thus, it is possible to allow the overall apparatus to be more compact. In particular, it is possible to further allow the overall apparatus to be more compact by coaxially arranging the rotation check 46 and the second cam teeth 48b.

(5) According to the embodiment disclosed here, the maximum movement amount of the driving shoe 21 which defines the tilting-up state of the movable panel 12 is not limited by the movement amount of the driving shoe 21 in the opposite direction (to the rear part of the vehicle) when the movable panel 12 is in the opened state. Therefore, it is possible to increase the maximum movement amount of the driving shoe 21 which defines the tilting-up state of the movable panel 12, that is, an opening amount of the movable panel 12 in the tilting-up state.

The above-described embodiment may be modified as follows.

Figure 10:
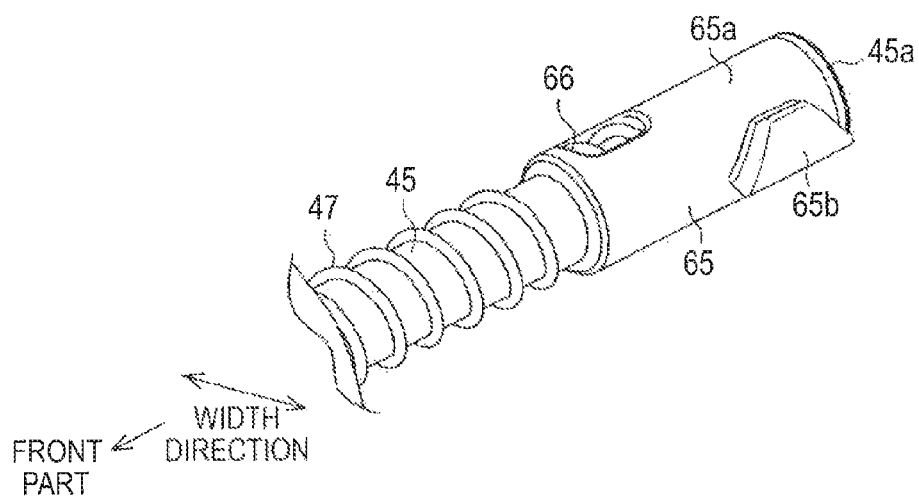
FIG. 10 is a perspective view illustrating a modification example of the rotary cam according to an embodiment disclosed here.

As illustrated in FIG. 10, a rotary cam 65 which is more extended to part of the vehicle compared to the rotary cam 48 may be adopted. That is, the rotary cam 65 has a substantially cylindrical main body portion 65a whose inner diameter is the same as the outer diameter of the support shaft 45 and whose outer diameter is the same as the outer diameter of the enlarged diameter portion 45a, and has second cam teeth 65b which are disposed to protrude on an outer peripheral surface of the main body portion 65a and which are similar to the pair of second cam teeth 48b. The rotary cam 65 is configured so that the main body portion 65a is more extended to the front part of the vehicle compared to the second cam teeth 65b. Accordingly, the rotary cam 65 is extended to the front part of the vehicle as a whole.

Then, a pair of through-holes 66 is formed in the extended portion of the main body portion 65a so as to face each other in the radial direction centered on the axis of the rotary cam 65. Both of the through-holes 66 are arranged to face each other in the height direction of the vehicle when both of the second cam teeth 65b are arranged to face each other in the width direction of the vehicle. That is, both of the through-holes 66 are arranged so that the phase is deviated from both of the second cam teeth 65b by the predetermined angle (90°). The rotary cam 65 causes both of the through-holes 66 to be arranged to face each other in the height direction of the vehicle when both of the second cam teeth 65b can pass through both of the opening portions 53a of the second stationary side member 53.

Figure 11A:
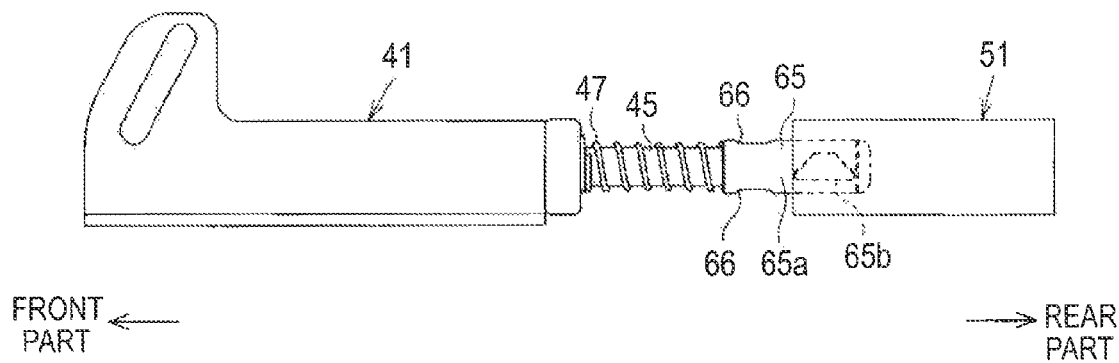
FIGS. 11A and 11B are side views illustrating an engagement state and a disengagement state with the stationary cam in the modification example.

Accordingly, as illustrated in FIG. 11A, when both of the second cam teeth 65b of the rotary cam 65 inserted into the rear end portion of the stationary cam 51 are respectively located in both of the opening portions 53a, both of the through-holes 66 are arranged to face each other in the height direction of the vehicle.

Figure 11B:
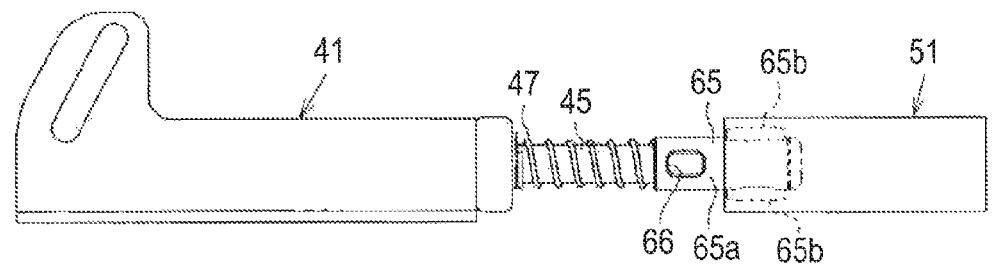

In contrast, as illustrated in FIG. 11B, both of the through-holes 66 are arranged to face each other in the width direction of the vehicle, when the rotary cam 65 is pivotally moved by the predetermined angle (90°) and both of the second cam teeth 65b of the rotary cam 65 are respectively located in both of the locking portions 53c. At this time, the front end portion of the rotary cam 65 where both of the through-holes 66 are formed protrudes to the front part of the vehicle from the stationary cam 51, and both of the through-holes 66 are exposed in the width direction of the vehicle.

As described above, even in a state where the rear end portion of the rotary cam 65 is inserted into the stationary cam 51, the rotary cam 65 is visually checked in the width direction of the vehicle, for example. In this manner, it is possible to determine whether or not the stationary cam 51 and the rotary cam 65 are in a state of engaging with each other. Specifically, if the through-hole 66 can be checked when viewed in the width direction of the vehicle, the stationary cam 51 and the rotary cam 65 are in the state of engaging with each other. If the through-hole 66 cannot be checked, the stationary cam 51 and the rotary cam 65 are in a state of disengaging from each other.

According to this change, for example, when the driving shoe 21 is assembled to the guide rail 13 in the engagement state between the stationary cam 51 and the rotary cam 65 during an assembly process on the roof 10, the through-hole 66 is visually checked in advance in the width direction of the vehicle. In this manner, it is possible to avoid assembly in an incorrect state (disengaging state). If the driving shoe 21 is assembled in the state where the stationary cam 51 and the rotary cam 65 disengage from each other, the movable panel 12 maintains the tilting-up state without performing an opening operation, even when the movable panel 12 is caused to perform the opening operation, for example.

In addition, as described above, in a state where the sunroof apparatus 11 is used, the engagement state between the stationary cam 51 and the rotary cam 65 is equivalent to the opened state of the movable panel 12, that is, a state where dust particles are likely to enter through the opening 10a. However, in the engagement state between the stationary cam 51 and the rotary cam 65, the through-hole 66 is located in the width direction of the vehicle, that is, the through-hole 66 is not located to face upward. Therefore, it is possible to decrease a possibility that the dust particles may enter a gap between the support shaft 45 and the rotary cam 65 from the through-hole 66. Consequently, it is possible to suppress a malfunction of the rotary cam 65.

Furthermore, the metal-made support shaft 45 is exposed from the through-hole 66. In this manner, there is an obvious contrast with the resin-made rotary cam 65. Accordingly, it is possible to more easily and visually check the engagement state between the stationary cam 51 and the rotary cam 65.

Instead of the through-hole 66, for example, a notch which opens to the front part of the vehicle may be adopted, or any desired mark drawn on the main body portion 65a may be adopted. In addition, any one may be adopted in which a marker such as the through-hole 66 can be visually checked in the width direction of the vehicle in the disengaging state between the stationary cam 51 and the rotary cam 65, and in which a marker such as the through-hole 66 cannot be visually checked in the width direction of the vehicle in the engaging state between the stationary cam 51 and the rotary cam 65.

In the above-described embodiment, the guide surface may tilt at a substantially constant tilting angle so as to face upward as it goes toward the rear part of the vehicle.

In the above-described embodiment, the number and the arrangement of the second cam teeth of the rotary cam may be arbitrarily selected. In brief, any configuration may be adopted if the rotary cam can be pivotally moved by guidance of the guide surface so that both rotation positions of the opening portion of the stationary cam and the second cam teeth of the rotary cam coincide with each other.

In the above-described embodiment, the stationary cam 51 and the rotary cam 48 are arranged in the driving shoe 21 and the support bracket 31 edge portion of the movable panel 12 in the width direction of the vehicle). However, an arrangement relationship therebetween may be reversely configured. In this case, the stationary cam 51 is arranged in the front part of the vehicle from the rotary cam 48. Accordingly, the guide surface may basically tilt so as to face upward as it goes toward the front part of the vehicle.

In the above-described embodiment, the linear portion 30b of the guide groove 30 may be omitted.

In the above-described embodiment, the movement regulation and the movement release of the movable panel 12 which are performed by the check mechanism 40 are switched therebetween by the engagement and the disengagement between the engagement projection 46a and the engagement groove 19a in response to the pivotal movement of the rotation check 46. In contrast, for example, as long as there is provided a check mechanism in which the movement regulation and the movement release of the movable panel 12 are realized by an electrical control, the check mechanism may switch between the movement regulation and the movement release by moving a check in the height direction or in the width direction of the vehicle. That is, the arrangement and the structure of the check mechanism may be arbitrarily adopted.

In the above-described embodiment, the slide check 41, the rotation check 46, and the rotary cam 48 are connected integrally. However, these may be independently connected to a peripheral edge portion of the movable panel 12.

In the above-described embodiment, the rotation check 46 and the engagement-disengagement switching mechanism 50 (the rotary cam 48 and the stationary cam 51) are arranged coaxially. However, as long as these extend in the longitudinal direction, axes thereof may be different from each other.

In the above-described embodiment, when the movable panel 12 is shifted from the opened state to the closed state, the regulation portion 28 presses the portion to be pressed 46b of the rotation check 46. However, as long as there is no hindrance to a function thereof, the regulation portion 28 may press an appropriate position on the movable panel 12 side.

As the tilting-up state of the movable panel 12, the above-described embodiment adopts two stages of the first tilting-up state and the second tilting-up state in which the movable panel 12 is further tilted up as compared to the first tilting-up state. In contrast, a posture in the initial tilting-up state to which the movable panel 12 is shifted from the fully closed state may coincide with a posture in the tilting-up state when the movable panel 12 performs the slide operation.

In the above-described embodiment, a linking aspect between the driving shoe 21 and the support bracket 31 (movable panel 12) is an example. For example, a guide groove oriented in a direction opposite to the guide groove 30 may be formed in the support bracket 31 (vertical wall portion 32), and an ascending-descending guide pin which is movably fitted to the guide groove may be fixedly attached to the driving shoe 21.

In the above-described embodiment, the guide block 19 may be disposed integrally with the guide rail 13.

Next, technical ideas which can be understood from the above-described embodiment and other examples will be appended as follows.

An aspect of this disclosure is directed to a vehicle sunroof apparatus including: a movable panel that is adapted to open and close an opening formed on a roof of a vehicle; a guide rail that is disposed in each edge portion of the opening in a width direction of the vehicle and that extends in a longitudinal direction of the vehicle; a slide member that is linked to each edge portion of the movable panel in the width direction of the vehicle, that is disposed to be movable along the guide rail, and that is driven to move by an electrical driving source; a check mechanism that regulates a movement of the movable panel in the longitudinal direction when the slide member moves to a front part of the vehicle in a fully closed state of the movable panel, that shifts the fully closed state to a tilting-up state by causing a rear side section to ascend about a fulcrum of a front side section of the movable panel, and that releases the movement regulation of the movable panel by maintaining the tilting-up state when the slide member moves to a rear part of the vehicle after moving further to the front part of the vehicle in the tilting-up state; a first member that is supported by any one of each edge portion of the movable panel in the width direction of the vehicle and the slide member; and a second member that is supported by the other one of each edge portion of the movable panel in the width direction of the vehicle and the slide member so as to be pivotally movable around an axis extending in the longitudinal direction of the vehicle, wherein the first member includes a first stationary side member which has a plurality of first cam teeth arranged at each predetermined angle around the axis and having a concave portion and a convex portion in the axial direction, and a second stationary side member which is disposed on a side of the first stationary side member which faces the second member, and which has an opening portion for opening an entry to the first cam teeth at each of the predetermined angles around the axis and a locking portion for closing the entry to the first cam teeth, the second member includes second cam teeth which pass through the opening portion and are pressed by the first cam teeth when the slide member moves further to the front part of the vehicle in the tilting-up state, which are pressed by the locking portion when the slide member moves to the rear part of the vehicle thereafter, and in this manner, the second cam teeth are pivotally moved by the predetermined angle, and engage with the locking portion, and a guide surface which can come into contact with the second cam teeth so as to guide the slide member in order to cause both rotation positions of the second cam teeth and the opening portion to coincide with each other when the slide member moves further to the front part of the vehicle in the tilting-up state is formed in each edge portion of the movable panel in the width direction of the vehicle or the slide member which supports the first member.

According to this configuration, in the tilting-up state, if the slide member moves to rear part of the vehicle after moving further to the front part of the vehicle, the check mechanism maintains the tilting-up state, and releases the movement regulation of the movable panel. In contrast, the second cam teeth pass through the opening portion, and are pressed by the first cam teeth when the slide member moves further to the front part of the vehicle in the tilting-up state. The second cam teeth are pressed by the locking portion when the slide member moves to the rear part of the vehicle thereafter. In this manner, the second cam teeth are pivotally moved by the predetermined angle, and engage with the locking portion. As described above, the locking portion of the first member and the second cam teeth of the second member engage with each other. In this manner, the movable panel moves integrally when the slide member moves to the rear part of the vehicle. Then, the movable panel is opened while the tilting-up state is maintained. In this case, the maximum movement amount of the slide member which defines the fully opened state of the movable panel is not limited by the movement amount of the slide member in an opposite direction (to the front part of the vehicle) when the movable panel is in the tilting-up state. Therefore, it is possible to increase the maximum movement amount of the slide member which defines the fully opened state of the movable panel, that is, an opening amount of the movable panel.

In particular, when the slide member moves further to the front part of the vehicle in the tilting-up state, in a state where both rotation positions of the second cam teeth and the opening portion do not coincide with each other, the second cam teeth come into contact with the guide surface. In this manner, the second cam teeth are guided so that these rotation positions coincide with each other. Accordingly, even when the rotation position of the second cam teeth is deviated from the rotation position of the opening portion, the second cam teeth can more reliably pass through the opening portion.

In the vehicle sunroof apparatus according to the aspect described above, it is preferable that the guide surface has a second guide surface which tilts upward and is disposed on a side of the second stationary side member which faces the second member, and a first guide surface whose tilting angle is greater than that of the second guide surface and which is disposed on a side on the second guide surface which faces the second member.

According to this configuration, it is possible to further shorten a distance of the guide surface in the longitudinal direction of the vehicle, as compared to a case where the tilting angle of the overall guide surface is configured to have the tilting angle of the second guide surface.

In the vehicle sunroof apparatus according to the aspect described above, it is preferable that the check mechanism maintains the tilting-up state while releasing the movement regulation of the movable panel, until the movable panel is in an initial resetting state in which the fully closed state is shifted to the tilting-up state, when the slide member moves to the front part of the vehicle, in an opened state of the movable panel, the check mechanism includes a regulation portion which regulates the pressing of the first cam teeth against the second cam teeth until the movable panel is in the resetting state, when the slide member moves to the front part of the vehicle in the opened state of the movable panel, and the second cam teeth are pressed against the first cam teeth when the slide member moves further to the front part of the vehicle in the resetting state, and is guided to the opening portion when the slide member moves to the rear part of the vehicle thereafter, and in this manner, the second cam teeth are pivotally moved by the predetermined angle and pass through the opening portion.

According to this configuration, if the slide member moves to the front part of the vehicle in the opened state of the movable panel, the check mechanism maintains the tilting-up state while the movement regulation of the movable panel is released until the movable panel is in the resetting state. Then, the movable panel moves to the front part of the vehicle integrally with the slide member, and is closed while the tilting-up state is maintained. At this time, the regulation portion regulates the pressing of first cam teeth against the second cam teeth. In this manner, for example, it is possible to avoid a case where the first member and the second member are unstably operated.

If the movable panel is in the resetting state thereafter, the check mechanism regulates the movement of the movable panel, and releases the maintaining of the tilting-up state. Then, when the slide member moves further to the front part of the vehicle in the resetting state, the second cam teeth are pressed by the first cam teeth, and when the slide member moves to the rear part of the vehicle thereafter, the second cam teeth are guided by the opening portion. In this manner, the second cam teeth are pivotally moved by the predetermined angle, and pass through the opening portion. As described above, the first member and the second member disengage from each other. In this manner, the slide member moves to the rear part of the vehicle while leaving the movable panel behind. Accordingly, the engagement-disengagement switching mechanism can cause the first member and the second member to disengage from each other by using a very simple structure in which the second cam teeth are pressed by the first cam teeth, are guided by the opening portion, and are pivotally moved by the predetermined angle.

Then, in response to the movement of the slide member to the rear part of the vehicle, the rear side section of the movable panel descends about the fulcrum of the front side section, and the movable panel is in the fully closed state. In this case, it is possible to ensure a sufficient movement amount of the slide member when the movable panel is shifted from the tilting-up state to the fully closed state. Therefore, it is possible to decrease a load per unit movement amount of the slide member. Consequently, it is possible to avoid an increase in the size of the electrical driving source.

In the vehicle sunroof apparatus according to the aspect described above, it is preferable that the check mechanism includes a guide block in which an engagement groove is formed and which is disposed in the guide rail, and a rotation check which has an engagement projection capable of engaging with the engagement groove, which is connected to each edge portion of the movable panel in the width direction of the vehicle so as to be pivotally movable around a second axis extending in the longitudinal direction of the vehicle, whose pivotal movement is regulated in a state where the engagement projection engages with the engagement groove in the fully closed state, which regulates the movement of the movable panel when the slide member moves to the front part of the vehicle, whose pivotal movement around the second axis is allowed when the slide member moves further to the front part of the vehicle in the tilting-up state, and which releases the movement regulation of the movable panel in such a manner that the engagement projection is pivotally moved and guided so as to disengage from the engagement groove when the slide member moves to the rear part of the vehicle thereafter.

According to this configuration, the movement regulation and the movement release of the movable panel which are performed by the check mechanism are switched therebetween by the engagement and the disengagement between the engagement projection and the engagement groove in response to the pivotal movement of the rotation check around the second axis. In contrast, the engagement between the first member and the second member is realized by the further movement of the slide member to the front part of the vehicle in the tilting-up state, that is, the movement along the second axis. Accordingly, the movement regulation and the movement release of the movable panel which are performed by the check mechanism, and the engagement between the first member and the second member can be realized in conjunction with the movement in the longitudinal direction of the vehicle along the movement direction of the slide member. Accordingly, for example, it is possible to allow the overall apparatus to be more compact by connecting the rotation check to the second member and collectively arranging the second member and the rotation check.

In the vehicle sunroof apparatus according to aspect described above, it is preferable that the check mechanism includes a second slide member which is disposed to be movable along the guide rail, and which is connected to each edge portion of the movable panel in the width direction of the vehicle so as to allow the movable panel to be shifted to the tilting-up state when the slide member moves to the front part of the vehicle in the fully closed state, and the second cam teeth are connected to the second slide member so as to be pivotally movable around the second axis.

According to this configuration, the second cam teeth are connected to the second slide member of the check mechanism so as to be pivotally movable. In this manner, it is possible to collectively arrange the second cam teeth (second member) in the check mechanism, and thus, it is possible to allow the overall apparatus to be more compact. In particular, it is also possible to obtain an operation effect which enables the overall apparatus to be more compact, by applying this configuration to the configuration described above. In this case, it is more effective to coaxially arrange the rotation check and the second cam teeth (the axis and the second axis).

In the vehicle sunroof apparatus according to the aspect described above, it is preferable that the second member is exposed from the first member in a state of being inserted into the first member, and a marker for distinguishing an engagement state and a disengagement state between the first member and the second member is disposed in an exposed portion of the second member.

According to this configuration, even in a state where the second member is inserted into the first member, the marker is visually checked. In this manner, it is possible to distinguish the engagement state and the disengagement state between the first member and the second member.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle sunroof apparatus comprising:
   a movable panel that is adapted to open and close an opening formed on a roof of a vehicle;
   a guide rail that is disposed in each edge portion of the opening in a width direction of the vehicle and that extends in a longitudinal direction of the vehicle;
   a slide member that is linked to each edge portion of the movable panel in the width direction of the vehicle, that is disposed to be movable along the guide rail, and that is driven to move by an electrical driving source;
   a check mechanism that regulates a movement of the movable panel in the longitudinal direction when the slide member moves to a front part of the vehicle in a fully closed state of the movable panel, that shifts the fully closed state to a tilting-up state by causing a rear side section to ascend about a fulcrum of a front side section of the movable panel, and that releases the movement regulation of the movable panel by maintaining the tilting-up state when the slide member moves to a rear part of the vehicle after moving further to the front part of the vehicle in the tilting-up state;
   a first member that is supported by the slide member; and
   a second member that is supported by a support shaft so as to be pivotally movable around an axis extending in the longitudinal direction of the vehicle,
   wherein the first member includes
      a first stationary side member which has a plurality of first cam teeth arranged at each predetermined angle around the axis and having a concave portion and a convex portion in the axial direction, and
      a second stationary side member which is disposed on a side of the first stationary side member which faces the second member, and which has an opening portion for opening an entry to the first cam teeth at each of the predetermined angles around the axis and a locking portion for closing the entry to the first cam teeth,
   wherein the second member includes second cam teeth which pass through the opening portion and are pressed by the first cam teeth when the slide member moves further to the front part of the vehicle in the tilting-up state, which are pressed by the locking portion when the slide member moves to the rear part of the vehicle thereafter, and in this manner, the second cam teeth are pivotally moved by the predetermined angle, and engage with the locking portion, and
   wherein a guide surface which can come into contact with the second cam teeth so as to guide the slide member in order to cause both rotation positions of the second cam teeth and the opening portion to coincide with each other when the slide member moves further to the front part of the vehicle in the tilting-up state is formed in the slide member which supports the first member.

2. The vehicle sunroof apparatus according to claim 1, wherein the guide surface has a second guide surface which tilts upward and is disposed on a side of the second stationary side member which faces the second member, and a first guide surface whose tilting angle is larger than that of the second guide surface and which is disposed on a side on the second guide surface which faces the second member.

3. The vehicle sunroof apparatus according to claim 1, wherein the check mechanism maintains the tilting-up state while releasing the movement regulation of the movable panel, until the movable panel is in an initial resetting state in which the fully closed state is shifted to the tilting-up state, when the slide member moves to the front part of the vehicle, in an opened state of the movable panel,
wherein the check mechanism includes a regulation portion which regulates the pressing of the first cam teeth against the second cam teeth until the movable panel is in the resetting state, when the slide member moves to the front part of the vehicle in the opened state of the movable panel, and
wherein the second cam teeth are pressed by the first cam teeth when the slide member moves further to the front part of the vehicle in the resetting state, and is guided by the opening portion when the slide member moves to the rear part of the vehicle thereafter, and in this manner, the second cam teeth are pivotally moved by the predetermined angle and pass through the opening portion.

4. The vehicle sunroof apparatus according to claim 2, wherein the check mechanism maintains the tilting-up state while releasing the movement regulation of the movable panel, until the movable panel is in an initial resetting state in which the fully closed state is shifted to the tilting-up state, when the slide member moves to the front part of the vehicle, in an opened state of the movable panel,
wherein the check mechanism includes a regulation portion which regulates the pressing of the first cam teeth against the second cam teeth until the movable panel is in the resetting state, when the slide member moves to the front part of the vehicle in the opened state of the movable panel, and
wherein the second cam teeth are pressed by the first cam teeth when the slide member moves further to the front part of the vehicle in the resetting state, and is guided by the opening portion when the slide member moves to the rear part of the vehicle thereafter, and in this manner, the second cam teeth are pivotally moved by the predetermined angle and pass through the opening portion.

* * * * *